(12) United States Patent
Penman et al.

(10) Patent No.: US 11,130,924 B2
(45) Date of Patent: Sep. 28, 2021

(54) SILICONE LUBRICANT

(71) Applicant: AB SPECIALTY SILICONES, LLC, Waukegan, IL (US)

(72) Inventors: Malcolm S. Penman, Gurnee, IL (US); Hans Haas, Stow, OH (US)

(73) Assignee: AB SPECIALTY SILICONES, LLC, Waukegan, IL (US)

( * ) Notice: Subject to any disclaimer, the term of this patent is extended or adjusted under 35 U.S.C. 154(b) by 523 days.

(21) Appl. No.: 14/440,550

(22) PCT Filed: Nov. 4, 2013

(86) PCT No.: PCT/US2013/068250
§ 371 (c)(1),
(2) Date: May 4, 2015

(87) PCT Pub. No.: WO2014/071285
PCT Pub. Date: May 8, 2014

(65) Prior Publication Data
US 2015/0284655 A1 Oct. 8, 2015

Related U.S. Application Data

(60) Provisional application No. 61/721,934, filed on Nov. 2, 2012.

(51) Int. Cl.
| | |
|---|---|
| *C10M 111/04* | (2006.01) |
| *C08L 83/06* | (2006.01) |
| *C10M 107/50* | (2006.01) |
| *C10M 109/02* | (2006.01) |
| *B05D 3/06* | (2006.01) |
| *C08G 77/16* | (2006.01) |
| *C08G 77/14* | (2006.01) |
| *C10N 10/02* | (2006.01) |
| *C10N 10/04* | (2006.01) |
| *C10N 10/06* | (2006.01) |
| *C10N 10/08* | (2006.01) |
| *C10N 10/10* | (2006.01) |
| *C10N 70/00* | (2006.01) |

(52) U.S. Cl.
CPC ........... *C10M 111/04* (2013.01); *B05D 3/067* (2013.01); *C08L 83/06* (2013.01); *C10M 107/50* (2013.01); *C10M 109/02* (2013.01); *C08G 77/14* (2013.01); *C08G 77/16* (2013.01); *C10M 2201/041* (2013.01); *C10M 2201/062* (2013.01); *C10M 2201/087* (2013.01); *C10M 2201/103* (2013.01); *C10M 2201/105* (2013.01); *C10M 2201/12* (2013.01); *C10M 2229/0415* (2013.01); *C10N 2010/02* (2013.01); *C10N 2010/04* (2013.01); *C10N 2010/06* (2013.01); *C10N 2010/08* (2013.01); *C10N 2010/10* (2013.01); *C10N 2070/00* (2013.01)

(58) Field of Classification Search
CPC ........ B05D 3/067; C08G 77/14; C08G 77/16; C08L 83/06; C10M 107/50; C10M 109/02; C10M 111/04; C10M 2201/041; C10M 2201/062; C10M 2201/087; C10M 2201/103; C10M 2201/105; C10M 2201/12; C10M 2229/0415; C10N 2210/01; C10N 2210/02; C10N 2210/03; C10N 2210/04; C10N 2210/05; C10N 2270/00; C10N 2010/06; C10N 2010/08; C10N 2010/10
See application file for complete search history.

(56) References Cited

U.S. PATENT DOCUMENTS

| | | | |
|---|---|---|---|
| 3,408,325 A * | 10/1968 | Nitzsche | ................ C08G 77/24 528/34 |
| 3,824,208 A | 7/1974 | Link et al. | |
| 4,147,646 A | 4/1979 | Cappo | |
| 4,372,988 A | 2/1983 | Bahder | |
| 4,490,314 A | 12/1984 | DuPont et al. | |
| 5,200,234 A | 4/1993 | Bertini | |
| 5,281,455 A | 1/1994 | Braun et al. | |
| 5,372,841 A | 12/1994 | Kleyer et al. | |
| 5,616,646 A | 4/1997 | Kendall | |
| 5,919,442 A | 7/1999 | Yin et al. | |
| 6,015,777 A | 1/2000 | Lostritto, Jr. et al. | |
| 6,172,150 B1 * | 1/2001 | Kollmann | ............ C08K 5/0008 524/379 |

(Continued)

FOREIGN PATENT DOCUMENTS

| | | | | |
|---|---|---|---|---|
| EP | 0564253 A1 * | 10/1993 | ............. | C08G 77/20 |
| RU | 2252235 C1 | 5/2005 | | |

*Primary Examiner* — Robert S Walters, Jr.
(74) *Attorney, Agent, or Firm* — Blue Filament Law PLLC

(57) ABSTRACT

A curing formulation operative as a lubricant is provided that has a plurality of silicone polymer precursors constituting a majority by weight of the formulation, each of the plurality of the silicone polymer precursors has a single curable moiety. A crosslinker is provided for reaction with the single curable moiety of each of the plurality of silicone polymer precursors to yield a thermoplastic silicone polymer having a majority by total weight of silicone polymer being comb- or branched-polymer form as the lubricant. A process of lubricating an interface is provide that includes the application of an aforementioned composition to the interface. Upon allowing sufficient time for the formulation to cure in ambient temperature conditions, a thermoplastic silicone polymer is formed having a majority by total weight of silicone polymer being comb- or branched-polymer.

7 Claims, No Drawings

(56) References Cited

U.S. PATENT DOCUMENTS

| | | | |
|---|---|---|---|
| 6,512,072 B1 | 1/2003 | Gantner et al. | |
| 6,797,772 B2 | 9/2004 | Nakayoshi et al. | |
| 7,198,205 B1 | 4/2007 | Solomon et al. | |
| 7,722,951 B2 | 5/2010 | Li et al. | |
| 7,976,747 B2 | 7/2011 | Bertini | |
| 8,569,439 B2 | 10/2013 | Ederer et al. | |
| 2007/0142575 A1 | 6/2007 | Zheng et al. | |
| 2007/0178321 A1* | 8/2007 | Haas | C09D 183/04 428/447 |
| 2009/0227481 A1* | 9/2009 | Han | C10M 171/002 508/205 |
| 2009/0321222 A1 | 12/2009 | Li et al. | |
| 2011/0028639 A1* | 2/2011 | Knepper | C08L 83/04 524/588 |
| 2012/0064022 A1* | 3/2012 | Wray | C08L 83/14 424/70.12 |
| 2016/0017195 A1 | 1/2016 | Pichl et al. | |

\* cited by examiner

SILICONE LUBRICANT

RELATED APPLICATIONS

This application claims priority benefit to U.S. Provisional application Ser. No. 61/721,934 filed Nov. 2, 2012; the contents of which are hereby incorporated by reference.

FIELD OF THE INVENTION

The present invention in general relates to silicone lubricants and in particular to silicone lubricants having an in situ curing component.

BACKGROUND OF THE INVENTION

Silicone greases are routinely used to lubricate interfaces so as to reduce friction. In instances where a dielectric grease is needed, such as interfaces associated with electrical components, silicone greases are routinely filled with silica where their electrical properties and thermal stability is highly valued. A representative conventional dielectric silicone grease includes 70-90 weight percent dimethyl silicone fluid, methyl silicone resin, or a combination thereof; 3-13 total weight percent silica; and 5-10 percent by weight polydimethyl silanol polymer with a degree of terminal silanol functionality. In such formulations, silica is used as a filler to provide body to the grease while the silicone based fluid and resin afford interfacial lubrication and electrical isolation.

Another class of conventional lubricants employs fluorosilicones in place of polyakyl siloxanes. Fluorosilicones are often used in instances where either the polysiloxane is incompatible with interfacial materials or different properties are desired relative to polysiloxane silicones such as polydimethylsiloxanes or polydialkylsiloxanes. One of the primary benefits of these lubricants is their ability to fill in surface imperfections either present in the molded or extruded parts or created by technicians during preparation and installation of an electrical assembly.

The performance characteristics of conventional greases are not ideal as lubricants. Owing to the differential flow properties of silicone resins, silica particulate, and low surface energy polysiloxane fluids, conventional grease formulations tend to segregate over time with the comparatively low molecular weight—low surface energy liquid component, such as the polysiloxane fluid or fluorosilicones fluids migrating away from the interface over time. This phenomenon is commonly referred to in the field of art as "pump-out" or "bleed-out." As particulate filler lacks the mobility of polysiloxane silicone fluids or fluorosilicone fluids, over time the grease tends to form a sticky paste that no longer properly lubricates the interface and requires effort to remove the thickened grease residue enriched in silica and resins from the interface. Additionally, as the grease undergoes flow separation, the changes in properties create failures that are particularly evident in high voltage systems.

In the context of an interface associated with electrical components, minor imperfections created by the bleed-out of the fluid results in a partial electrical discharge that over time ablates material from at least one interfacial surface with the prospect that if undiscovered can result in catastrophic failure. As points of partial discharge at an electrical component interface become points of electrical current concentration and once an imperfection develops, degradation of the interface tends to propagate therefrom. As a result, even an interface manufactured to a high degree of tolerance tends to degrade through operation without a dielectric grease present.

Prior art in this area concentrated on forming a thermoset matrix within a conventional fluid before use to slow the bleed-out. While it served to provide improvement in bleed-out, it created a product with very difficult application characteristics because of the thermoset component. Additionally, because the grease still contains a significant amount of conventional fluid a significant fraction of the finished grease is still susceptible to bleed-out over the long term. Also, the linear polymers of the conventional fluid poses limits on molecular weight due to application properties.

Thus, there exists a need for a composition and process for application thereof to an interface that improves properties of conventional silicone greases, especially with respect to the ability to minimize bleed-out and the failures caused by it, minimizes adhesion development over time allowing for easy disassembly, and allows for relatively easy clean-up so the technician does not need to spend an excessive amount of time cleaning the components to prepare them for re-assembly.

SUMMARY OF THE INVENTION

A curing formulation operative as a lubricant is provided that has a plurality of silicone polymer precursors constituting a majority by weight of the formulation, each of the plurality of the silicone polymer precursors has a single curable moiety. A crosslinker is provided for reaction with the single curable moiety of each of the plurality of silicone polymer precursors to yield a thermoplastic silicone polymer having a majority by total weight of silicone polymer being comb- or branched-polymer form as the lubricant. In some embodiments, the formulation includes the aforementioned components and optionally one or more of a cure catalyst, a filler, a diluent, a pigment, a dye, an interfacial adhesion promoter, an antioxidant, a foaming agent, or a water scavenger.

A process of lubricating an interface is provide that includes the application of an aforementioned composition to the interface. Upon allowing sufficient time for the formulation to cure in ambient temperature conditions, a thermoplastic silicone polymer is formed having a majority by total weight of silicone polymer being comb- or branched-polymer.

DETAILED DESCRIPTION OF THE PREFERRED EMBODIMENTS

The present invention has utility as a lubricant. The present invention in having the ability to fill imperfections and being amenable to inclusion of dielectric filler is particularly well-suited for application to electrical component interfaces. A basis for the effectiveness of the present invention is in situ cure to fill interfacial imperfections at the situs of formulation application. An inventive in situ cure lubricant is readily applied to an interface as an unfilled oil by conventional techniques such as spray application through an aerosol, pump spray or the like. A thermoplastic branched and/or comb-shaped polymer that could be used at a much higher level would provide superior bleed-out properties as higher molecular weight can be achieved at lower viscosity. This polymer can be formed either before application or in-situ according to the present invention.

Alternatively, an inventive lubricant composition is delivered to an interfacial surface situs inclusive of a filler in a manner as is common to conventional silicone greases. Through control of cure chemistry to yield a thermoplastic silicone polymer, the resultant lubricant has weak adhesive properties and good lubricity compared to a grease or caulk formed predominantly from a thermoset silicone.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

The polymerized highly branched thermoplastic silicones of the present invention are in a form of comb-, or dendrimer-polymers; where "dendrimer" is used herein synonymously with highly branched polymers, or other forms that are discrete cured polymer units. As a result, cured-in-place silicone polymers of the present invention exhibit thermoplastic flow with increased temperature regardless of cured-in-place polymer molecular weight. These polymers can range in viscosity from 50,000 (centipoise) cps to 20,000,000 cps and even higher.

An inventive in situ curing silicone lubricant is formed from a silicone polymer precursor able to undergo moisture- or free radical-induced cure. In a specific inventive embodiment, a majority as measured by the number of silicone polymer precursor molecules contain only one moiety curable under cure conditions so as to limit formation of a three-dimensional conventional silicone thermoset networks. Silicone polymer precursors operative herein illustratively include polysiloxanes, polysilanols, and combinations thereof with the proviso that the silicone polymer precursors each have at least one functional moiety, and in certain embodiments terminal functionality. The silanol moiety is exemplary of moieties operative herein to create upon cure a thermoplastic silicone polymer having a majority by total weight of silicone polymer being comb- or branched-polymer form and well suited to be the majority component of a lubricant. In other specific embodiments, greater than 50% percent by prepolymer molecule number are monofunctional with a single moiety reactive under in situ cure conditions. Moieties operative herein to react during in situ cure of prepolymers illustratively include vinyl, allyl, butadienyl, hexenyl, hydroxyl, $C_1$-$C_6$ alkoxyl, hydride and combinations thereof. It is appreciated that the molecular weight of silicone polymer precursors used herein is largely dictated by the desired application viscosity of an inventive formulation. As used herein, molecular weight as it relates to a polymer or prepolymer is defined as the viscosity molecular weight, $M_V$. Typical silicone polymer precursor or mixtures of multiple precursors typically have a viscosity at 20° C. of between 50 and 500,000 CentiStokes (Cst). In some embodiments, the viscosity at 20° C. of is greater than 50,000 and less than 500,000 Cst. An inventive formulation typically contains between 50 and 99.5 total weight percent of the formulation as silicone polymer precursors. It is appreciated that the kinetics of in situ cure of an inventive formulation and the resultant changes in composition viscosity are readily controlled with more rapid cure and a smaller change in overall composition viscosity upon cure being obtained through the use of higher molecular weight silicone polymer precursors, as compared to those precursors that have a smaller number of reactive moieties under cure conditions.

An inventive formulation is provided as a one-part formulation in instances where room temperature vulcanization (RTV) in situ cure is desired. A crosslinking agent operative herein for RTV moisture cure illustratively include acetoxy, oxime, and alkoxy crosslinkers with the general form $RSiX_3$ where R is methyl, ethyl, vinyl or other hydrocarbon radicals that are unreactive under cure conditions and X is an alkoxy, acetoxy, oximino or enoxy group. It is appreciated that an ethylenically unsaturated moiety is readily cured through the inclusion of a free-radical initiator conventional to the art, such as a peroxide or azide. An inventive formulation preferably includes a catalyst in instances when a more rapid in situ lubricant cure is desired, and where cure rate needs to be very slow the catalyst can be omitted. While one of skill in the art will appreciate that the nature of the catalyst and the resulting increase in cure rate are dependent upon the specifics of the crosslinker and silicone polymer precursors, in general, such catalysts are amines and organometallics illustratively including compounds of tin, titanium, platinum, and bismuth. Regardless of the nature of the silicone polymer precursors, concentrations thereof, crosslinkers, and other specific formulation attributes, an inventive formulation in many specific applications in order to balance lubricity and interfacial surface filling, an in situ cured silicone polymer has a terminal viscosity of 50,000 and 20,000,000 centipoise (cps). In still other specific embodiments, this controlled viscosity thermoplastic polysilicone has greater than 80% of the in situ curable silicone polymer precursor present in the formulation as supplied being crosslinked so as to inhibit precursor bleed from the interface. In other specific embodiments, greater than 90% of the silicone polymer precursor is actually crosslinked. In furtherance of balancing lubricity and interfacial surface imperfection fill, in specific embodiments of the present invention, the silicone polymer precursor and other formulation components are selected so as to provide a skin over time of greater than five minutes at 38° C. and 100% relative humidity for moisture cured formulations. Owing to the diffusional kinetics of water into an inventive formulation to induce moisture cure, it is appreciated that applications of an inventive formulation are generally limited to a thickness of less than 1 centimeter to ensure terminal cure in a timeframe well suited for equipment interfacial servicing times. It is appreciated that additional control over reactive kinetics is achieved through dual cure mechanisms of free radical and hydrolysis, as for example conventionally used with an initial ultraviolet light or peroxide induced free radical cure followed by a slower acetoxy or alkoxy moisture cure. It is appreciated that the inventive formulation is cured to form a densified or porous lubricant.

An inventive formulation for in situ cure to a thermoplastic lubricant is readily formulated to include fillers. A filler operative herein most variably includes particulate of calcium carbonate; silicas such as fumed silica, precipitated silica, colloidal silica; quartz; alumina; titania; diatomaceous earth; carbon black; boron nitride, boric acid; turbostratic carbon; zeolites; metals such as aluminum, copper, zinc, and alloys; and combinations thereof. It is appreciated that electrically conductive filler present at or above a percolation threshold affords pathways for electrical communication across a thickness of a cured silicone lubricant.

Where a dielectric lubricant is desired, large electronic band gap particulates are used as fillers, such as silicas, alumina, titania, and combinations thereof. Additionally, according to the present invention it is appreciated that those fillers such as boric acid and turbostratic carbon that form cylindrical structures in response to sheer forces are readily employed to improve the lubricant properties of a cured lubricant. The amount of filler present in an inventive formulation, if any, is appreciated to modify the properties of the uncured formulation with respect to viscosity, thixotropy, and coloration. Filler in the cured lubricant modifies properties as to strength, electrical conductivity, and lubricity. Typically, a filler, if present, in an inventive uncured formulation is present in amounts ranging from 0.3-30 total weight percent of the uncured formulation. Most commonly, when fillers are present in an inventive formulation, such fillers are present in an amount of between 4 and 20 total weight percent. Other additives that are readily present in an inventive formulation illustratively include one or more of a water scavenger to improve storage stability of an inventive formulation, a pigment, dye, silicone fluid diluent unreactive during in situ cure, silicone resin diluent unreactive during in situ cure, an adhesion promoter relative to an interfacial surface, an antioxidant, a foaming agent, and combinations thereof.

Exemplary formulation ranges as applied to an interface are provided in Table 1. Table 1.

TABLE 1

In Situ Cure Formulation Range of Components

| Component | Amount Total Weight Percent |
| --- | --- |
| Silicone Polymer Precursor | 27-99.5 |
| Crosslinker | 0.5-5 |
| Cure Catalyst | 0-3 |
| Filler | 0-30 |
| Diluents | 0-20 |
| Pigment | 0-5 |
| Dye | 0-5 |
| Anti-oxidant | 0-5 |
| Foaming Agent | 0-2 |
| Water Scavenger | 0-3 |

The present invention is further detailed with respect to the following non-limiting examples. These examples are not intended to limit the scope of the invention, including the appended claims.

Example 1

99.68 parts of monohydroxyl-terminated polydimethylsiloxane having a viscosity of 10,000 CentiStokes is combined with 0.2 parts of methyl tri-(butanone oxime) silane, 0.02 parts of dibutyl tin dilaurate, and 0.1 parts of water. This material is partially precured to a viscosity of 240,000 Centipoise and retains residual silanol functionality. This silicone polymer precursor is intermixed with fumed silica so that the precursor is present at 94 total weight percent and the silica is present at 6 total weight percent. The resultant material is storage stable with exclusion of moisture and applied to an interface to a thickness of about 2 mm and allowed to cure in ambient air moisture at 20° C. for 20 minutes prior to assembly. The resultant thermoplastic lubricant provided superior performance over a six month period in terms of lubricity, decreased partial discharge and decreased interfacial tracking relative to conventional dielectric grease composed of 82% dimethylpolysiloxane/methyl silicone resin, 11% silica, and 7% mono terminated hydroxy polydimethyl siloxane.

Example 2

The inventive formulation of Example 1 is reformulated such that no pre-cure occurs and all the components except for water are present. The lower viscosity inventive formulation is applied to an interfacial surface and shows excellent fill of interfacial surface contours prior to cure and has performance similar to that of inventive formulation of Example 1.

Example 3

The formulation of Example 1 is reproduced with the exception that the monofunctional silanol is replaced with a monofunctional perfluorosilanol. The resultant cured lubricant has performance properties similar to that of Example 1.

Examples 4 and 5

The formulation of Example 2 is reproduced with the exception that the crosslinker is replaced with a like amount of tri(acetoxy)methylsilane (Example 4) or dimethyl dimethoxy silane (Example 5) to achieve acetoxy and methoxy cure of silicone polymer precursor, respectively. The resultant cured lubricants of Examples 4 and 5 have performance properties similar to that of Example 2.

Example 6

0.2% of oil-soluble red colored dye is added to the formulation of Example 1 to color the inventive thermoplastic in situ cured silicone lubricant and to distinguish the same from conventional silicone and fluorosilicone lubricants.

Example 7

The formulation of Example 2 is reproduced with the exception that 50,000 Cst trimethylsiloxy-terminated PDMS is added to 10 total weight percent as a diluent. The resultant cured lubricant has performance properties similar to that of Example 2.

Comparative Example 90 parts by weight of 60,000 CentiStoke silicone fluid is combined with 5 parts by weight of a liquid silicone rubber consisting of 36.45 parts 65000 Cst linear vinyl fluid, 1.8 parts vinyl functional resin, 11.75 parts of TS-530 fumed silica and 30 ppm platinum catalyst having an initial viscosity of 150.000 cps and a durometer of 40±5 as a curable part A when combined with 5 parts by weight of a Part B consisting of 13.35 parts 65000 Cst linear vinyl fluid, 23.37 parts 35000 Cst linear vinyl fluid, 0.73 parts linear hydride fluid (1.6 mmol/g), 0.80 parts hydride crosslinker (15.5 mmol/g) and 11.75 parts TS-530 fumed silica.

Example 8

To assess the tendency of an inventive lubricant to develop deleterious adhesion, 2 inch by 8 inch strips of ethylene-propylene-diene terpolymers (EPDM) are half coated over a 1 inch by 4 inch section with the lubricant of Example 1 or the conventional grease of the Comparative Example. A second EPDM strip is mated to the half-coated strip in a peel mode and the joined strips are placed in an oven for 24 days at 80° C. under a pressure of 2 pounds per square inch. The strips are then removed and cooled and subjected to T-peel testing. Inventive lubricant of Example 1 has a peel strength adhesion of 0.24 pounds per linear foot while the comparative example have an adhesive T-peel strength of 1.40 pounds per linear foot.

Example 9

A 2,400 cps thermoplastic comb polymer of polydimethylsiloxane is formed according to Example 1. The polymer had a 24 mm bleed out at 12 days while maintained at 80° C. This compared favorably to a like 2,400 cps thermoplastic linear polymer of polydimethylsiloxane with a 41 mm bleed out at 12 days while maintained at 80° C.

Patents and publications mention the specification are indicative of the levels of those skilled in the art to which the invention pertains. These patents and publications are incorporated herein by reference to the same extent as if each individual patent or publication is specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A silicone polymer lubricant comprising:
a majority by total weight of silicone polymer having comb- or branched-polymer form that exhibit thermoplastic flow with a viscosity from 50,000 (centipoise) cps to 20,000,000 cps as measured at 20° C. formed from a plurality of silicone polymer precursors, a majority of said plurality of said silicone polymer precursors each having a single curable moiety wherein said single curable moieties are crosslinked in-situ on a substrate in need of lubrication.

2. The silicone polymer lubricant of claim 1 further comprising a silicone polymer diluent.

3. The silicone polymer lubricant of claim 1 further comprising a filler.

4. The silicone polymer lubricant of claim 3 wherein said filler is at least one of calcium carbonate, fumed silica, precipitated silica, colloidal silica, quartz, alumina, titania, diatomaceous earth, carbon black, boron nitride, boric acid, turbostratic carbon, zeolites, aluminum, copper, zinc, or metal alloys.

5. The silicone polymer lubricant of claim 3 wherein said filler is a silica.

6. The silicone polymer lubricant of claim 3 wherein said filler is fumed silica.

7. The silicone polymer lubricant of claim 1 further comprising a dye.

* * * * *